United States Patent

Govorkov et al.

[11] Patent Number: 5,946,337
[45] Date of Patent: Aug. 31, 1999

[54] HYBRID LASER RESONATOR WITH SPECIAL LINE NARROWING

[75] Inventors: Sergei V. Govorkov, Boca Raton, Fla.; Uwe Stamm, Göttingen, Germany

[73] Assignee: Lambda Physik GmbH, Germany

[21] Appl. No.: 09/070,112

[22] Filed: Apr. 29, 1998

[51] Int. Cl.[6] .................................................... H01S 3/08
[52] U.S. Cl. .............................. 372/92; 372/95; 372/98; 372/51; 372/106; 372/102
[58] Field of Search ............................. 372/92, 95, 102, 372/98, 57, 106

[56] References Cited

U.S. PATENT DOCUMENTS

| | | | |
|---|---|---|---|
| 4,156,209 | 5/1979 | Herbst et al. | 372/95 |
| 4,360,925 | 11/1982 | Brosnan et al. | 372/95 |
| 4,477,909 | 10/1984 | Salvi et al. | 372/95 |
| 4,873,692 | 10/1989 | Johnson et al. | 372/102 |
| 4,918,704 | 4/1990 | Caprara et al. | 372/95 |
| 5,596,596 | 1/1997 | Wakabayashi et al. | 372/57 |
| 5,657,334 | 8/1997 | Das et al. | 372/33 |
| 5,684,822 | 11/1997 | Partlo | 372/95 |

FOREIGN PATENT DOCUMENTS

WO 96/16455  5/1996  European Pat. Off. .

OTHER PUBLICATIONS

Bigio, Irving J. & Slatkine, Michael, "Injection–Locking Unstable Resonator Excimer Lasers", IEEE Journal of Quantum Electronics, Sep. 1983, vol. QE–19, No. 9, pp. 1426–1436.

*Primary Examiner*—Leon Scott, Jr.
*Attorney, Agent, or Firm*—Limbach & Limbach L.L.P.

[57] ABSTRACT

A laser system having a resonant cavity that is stable in one axis so that a wavelength selector can be used for producing a narrow line output, and is unstable in an orthogonal axis for high energy extraction efficiency and for low output beam divergence. The resonant cavity terminates at one end with a cylindrical mirror and at the other end with a dispersive wavelength selector. A gain medium is disposed in the resonant cavity, and is excited by a power supply to generate a laser beam that oscillates in the resonant cavity. A portion of the laser beam is coupled out of the resonant cavity as an output laser beam. The cylindrical mirror has a cylindrical reflecting surface oriented to diverge the laser beam at a first azimuthal angle relative to an axis of the resonant cavity. The dispersive wavelength selector disperses the laser beam as a function of wavelength at a second azimuthal angle relative to the resonant cavity axis. The second azimuthal angle is orthogonal to the first azimuthal angle.

41 Claims, 3 Drawing Sheets

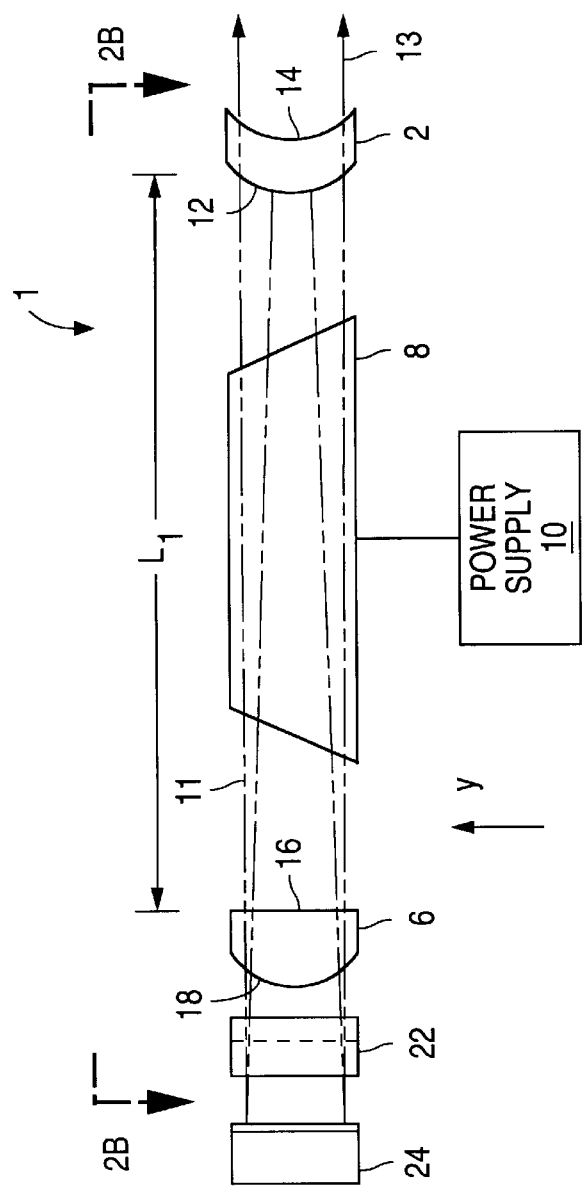
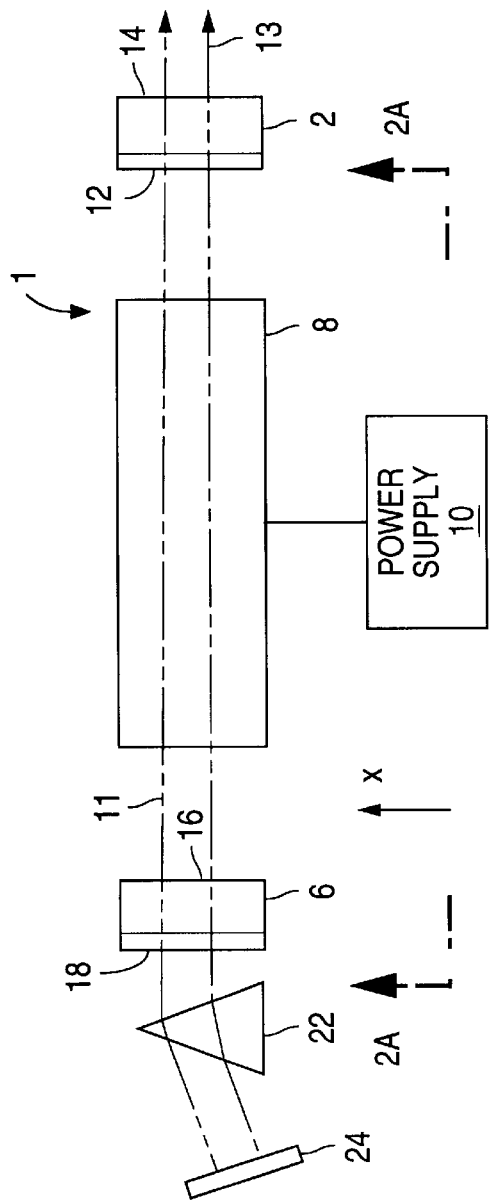
FIG. 2A
FIG. 2B

HYBRID LASER RESONATOR WITH SPECIAL LINE NARROWING

FIELD OF THE INVENTION

The present invention relates to laser systems, and more particularly to a narrow spectral linewidth laser system that employs an unstable resonator.

BACKGROUND OF THE INVENTION

Excimer lasers are typically configured with two opposing mirrors that define a resonant cavity, and a gain medium placed therebetween. The gain medium is a gas mixture of a halogen gas and a rare gas that is excited using electrodes to generate an intracavity laser beam that oscillates between the mirrors. Typical excimer laser systems cyclically activate the electrodes to generate a pulsed intracavity laser beam. One of the mirrors is partially transmissive to produce an output laser beam.

Excimer lasers are frequently equipped with stable resonators. A stable resonator is one in which the intracavity laser beam is focused into a confined path, typically with curved resonator mirrors and/or intracavity lenses. In excimer lasers and some other laser types, a nearly stable cavity can be formed by two flat mirrors since the number of round trips that light makes in this type of cavity is relatively small. In a stable resonator, the pulses bounce back and forth between the mirrors in a narrow intracavity beam without suffering significant diffraction losses due to energy loss caused by beam divergence.

Additionally, unstable resonators have been developed, in which a significant portion of the intracavity beam leaves the resonator on each round trip due to expansion of the beam caused by curved intra-cavity elements. As pulses bounce back and forth between the mirrors, the pulses diverge and spread out. A primary advantage of an unstable resonator is that it allows for high energy extraction efficiency (especially when using a large volume gain medium) with low divergence.

There are, however, drawbacks to unstable resonators. First, narrow linewidths from unstable resonators are difficult to achieve. Intracavity wavelength selectors, such as gratings and prisms, work only with an intracavity beam that is retro-reflected onto itself. The intracavity beam in a typical unstable resonator does not retro-reflect onto itself (meaning that a collimated beam is reflected as an uncollimated beam, and vice versa), which precludes using such wavelength selectors in an unstable resonator.

Secondly, the output beam from an unstable resonator typically contains significant low coherence light which is caused by Amplified Spontaneous Emission (ASE). Low coherent light in the output beam caused by ASE is highly divergent since it has not been subject to expansion by the curved A intra-cavity mirrors and/or lenses. The low coherence light reduces the spatial coherence of the output beam. There are applications, such as Fiber Bragg Grating (FBG) production, which require an output beam having low divergence and a narrow linewidth, and are incompatible with unstable a resonators that produce significant low coherence light.

There is a need for laser system cavity design that produces a low divergence, narrow line-width output beam, which still utilizes an unstable resonator for high energy extraction efficiency. Further, such a laser system design should also minimize low coherence light in the output beam caused by ASE.

SUMMARY OF THE INVENTION

The present invention solves the aforementioned problems by providing a laser resonator that is stable in one axis so that a wavelength selector can be used for producing a narrow line output, and is unstable in an orthogonal axis for high energy extraction efficiency and for low output beam divergence.

The laser resonator of the present invention includes a resonant cavity having an optical axis and a gain medium disposed in the resonant cavity for generating a laser beam that oscillates in the resonant cavity along the optical axis. A portion of the laser beam is coupled out of the resonant cavity as an output laser beam. The resonant cavity includes at least one optical element having a cylindrical surface oriented to diverge the laser beam at a first azimuthal angle relative to the resonant cavity axis, and a dispersive wavelength selector that disperses the laser beam as a function of wavelength at a second azimuthal angle relative to the resonant cavity axis. The second azimuthal angle is orthogonal to the first azimuthal angle.

In another aspect of the present invention, a laser system includes a resonant cavity that terminates at one end with a cylindrical mirror and at the other end with a dispersive wavelength selector. A gain medium is disposed in the resonant cavity. A power supply excites the gain medium to generate a laser beam that oscillates in the resonant cavity. A portion of the laser beam is coupled out of the resonant cavity as an output laser beam. The cylindrical mirror has a cylindrical reflecting surface oriented to diverge the laser beam at a first azimuthal angle relative to an axis of the resonant cavity. The dispersive wavelength selector disperses the laser beam as a function of wavelength at a second azimuthal angle relative to the resonant cavity axis. The second azimuthal angle is orthogonal to the first azimuthal angle.

In yet another aspect of the present invention, an excimer laser includes a hybrid resonant cavity that is stable in a first axis and unstable in a second axis orthogonal to the first axis, a gain medium disposed in the resonant cavity to generate a laser beam in the resonant cavity, and a dispersive wavelength selector oriented to disperse the laser beam as a function of wavelength in the first axis. A portion of the laser beam is coupled out of the resonant cavity as an output laser beam.

Other objects and features of the present invention will become apparent by a review of the specification, claims and appended figures.

BRIEF DESCRIPTION OF THE DRAWINGS

FIG. 2A is a side view of an alternate embodiment of the present invention that uses a prism based wavelength selector.

FIG. 2B is a top view of the alternate embodiment of the present invention that uses a prism based wavelength selector.

DETAILED DESCRIPTION OF THE PREFERRED EMBODIMENTS

The present invention is a hybrid laser resonator 1 which is unstable in one plane for high energy extraction efficiency and a low divergence output beam, and is stable in an orthogonal plane for spectral line narrowing.

Figures 1A, 1B:
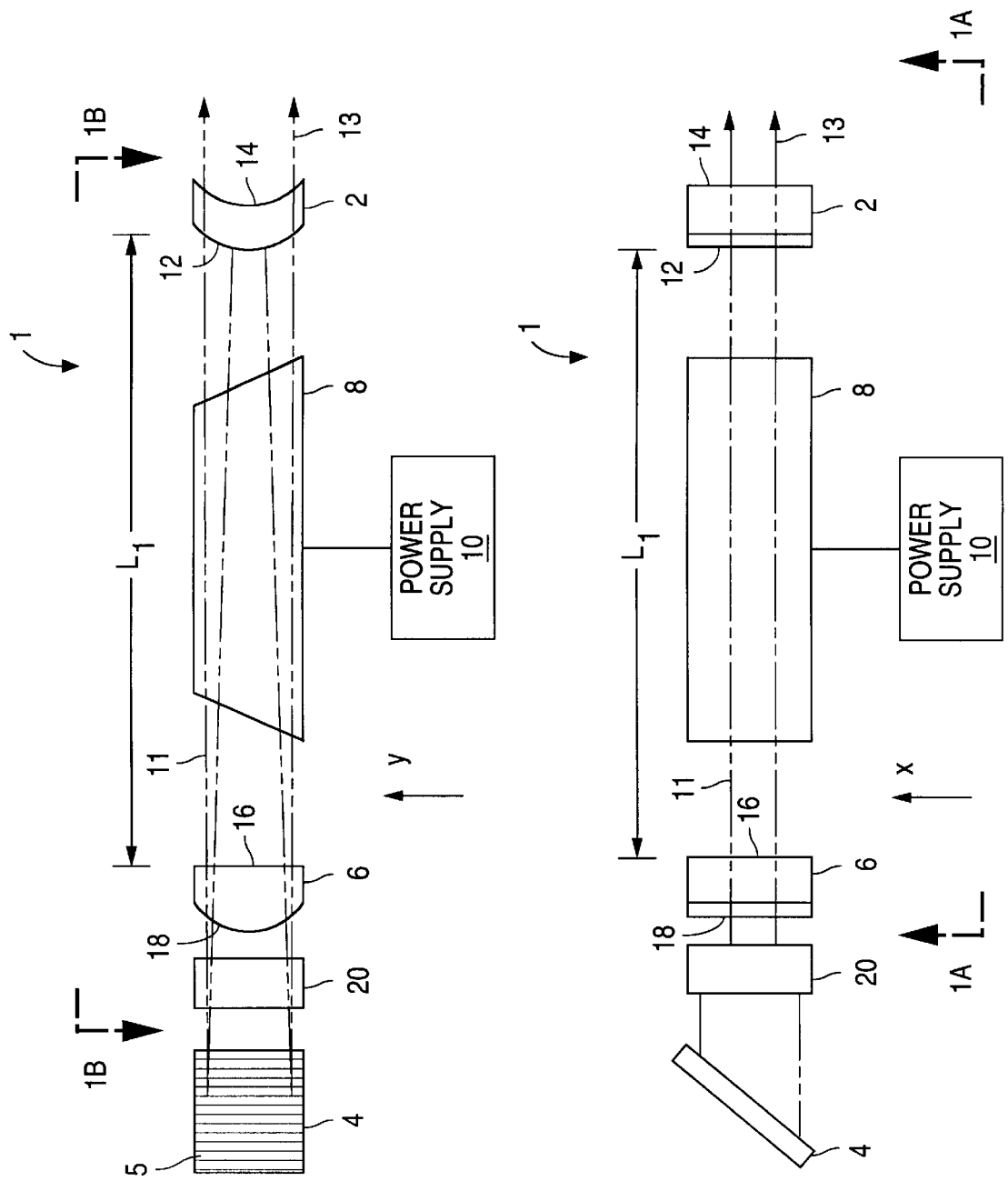
FIG. 1A is a side view of the unstable resonator of the present invention.
FIG. 1B is a top view of the unstable resonator of the present invention.

The hybrid resonator 1 of the present invention is illustrated in FIGS. 1A and 1B, and includes a partially reflecting output coupler mirror 2, a diffraction grating 4, a cylindrical lens 6 and a gain medium 8.

The gain medium 8 for the preferred embodiment is a cavity filled with a laser gas, such as a gas mixture of a halogen gas and a rare gas. The gas is electrically excited in a cyclical manner by a power supply 10 to produce a pulsed intracavity laser beam 11.

Output coupler mirror 2 is a cylindrical mirror having front surface 12 and back surface 14 that are both curved in one axis and flat in an orthogonal axis. More specifically, mirror front surface 12 is convex in a vertical (Y) oriented axis and flat in a horizontal (X) oriented axis. Likewise, mirror back surface 14 is concave in the vertical (Y) axis, and flat in the horizontal (X) axis. Thus, mirror 2 diverges light reflecting off of front surface 12 in the vertical (Y) direction while inducing no diverging effect in the horizontal (X) direction. Mirror 2 may have a partially reflecting coating on one or both surfaces 12/14 so that part of the intracavity beam 11 is transmitted out of the resonator as an output beam 13. Back surface 14 is concave so that the vertical (Y) component of output beam 13 is substantially collimated.

Cylindrical lens 6 has a flat first surface 16 and second surface 18 that is convex in the vertical (Y) axis and flat in the horizontal (X) axis. Thus, lens 6 collimates the vertical (Y) component of beam 11 while inducing no effect to the horizontal (X) component of beam 11.

Diffraction grating 4 is preferably a planar grating with grooves 5 that extend vertically (parallel to the same plane which contains the curvatures of mirror 2 and lens 6). An optional beam expander 20 can be added inside resonator 1 adjacent the diffraction grating 4 to increase the angular dispersion of the grating 4 and protect the grating from excessive optical power densities. The beam expander 20 can include spherical and/or cylindrical lenses, or alternatively expansion prisms, to expand the cross-sectional area of beam 11.

In the preferred embodiment, the mirror 2 has a radius of curvature R, while the cylindrical lens 6 has a focal length F. Ideally, a distance $L_1$ between the lens 6 and the mirror 2 should be close to:

$$L_1 = \frac{|F| - R}{2} \quad (1)$$

The hybrid resonator 1 of the present invention combines a stable resonator formed in one (horizontal) axis for producing a narrow line output, together with an unstable resonator in an orthogonal (vertical) axis for high energy extraction efficiency and for low output beam divergence. The output beam 13 is collimated in the plane of the unstable resonator, which makes this laser resonator design ideal for applications such as writing fiber Bragg gratings, which requires low divergence only along one axis of the output beam 13.

FIGS. 2A and 2B illustrate an alternate embodiment of the present invention, where the dispersive grating 4 is replaced with a prism 22 and reflective mirror 24. By tilting the prism 22 and mirror 24 combination, the desired narrow linewidth can be selected.

Figure 3:
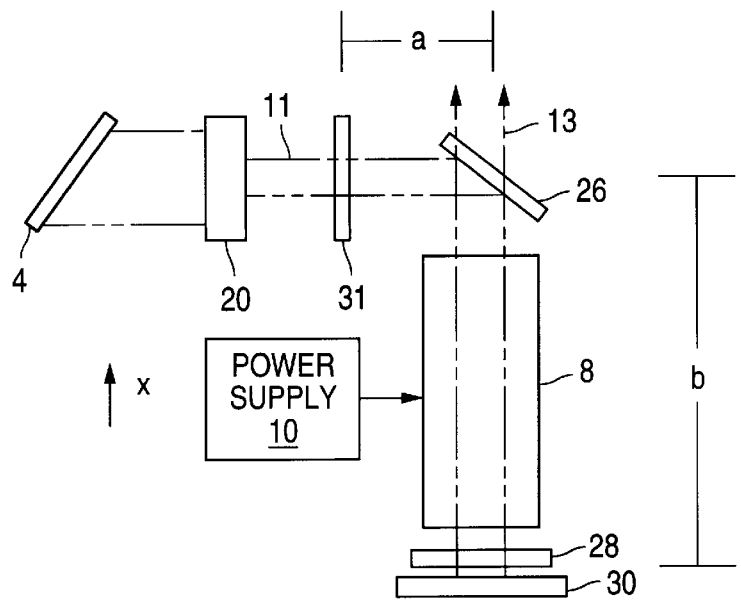
FIG. 3 is a top view of a second alternate embodiment of the unstable resonator of the present invention that uses a polarizer based output coupler.

FIG. 3 illustrates a second alternate embodiment of the present invention. The hybrid resonator 1 includes a diffraction grating 4 (which could instead be a mirror and prism), and a highly reflective mirror 30. A thin film or Glan polarizer 26 is used to fold the intracavity beam 11. Thin film polarizers work most efficiently at a fold angle near or at Brewster's angle. A quarter wave plate 28 is disposed between the mirror 30 and gain medium 8. A negative cylindrical lens 31, with an optional beam expander 20, are disposed adjacent the grating 4. The combination of the polarizer 26 and quarter wave plate 28 are used as an adjustable means for coupling light out of the resonator 1. The quarter wave plate 28 rotates the plane of polarization. The out-of-plane portion of beam 11 is transmitted through polarizer 26, while the remaining part of the beam 11 is reflected to lens 31 for another round trip through the resonant cavity. Highly reflective mirror 30 has a concave reflecting surface with radius of curvature R, and lens 31 is a negative cylindrical lens with a negative focal length F. The distance $L_2$ (which equals the sum of the lengths a and b in each leg of the resonator 1 as illustrated in FIG. 3) along folded intracavity beam path 11 between the lens 31 and mirror 30 is ideally $$L_2 = \frac{R - |F|}{2} \quad (2)$$

The degree of out-coupling can easily be adjusted by rotating waveplate 28 because the rotational orientation of the waveplate about the laser beam determines the proportion of the beam that is out-of-plane polarized, which is coupled out of the cavity by polarizer 26.

Figure 4:
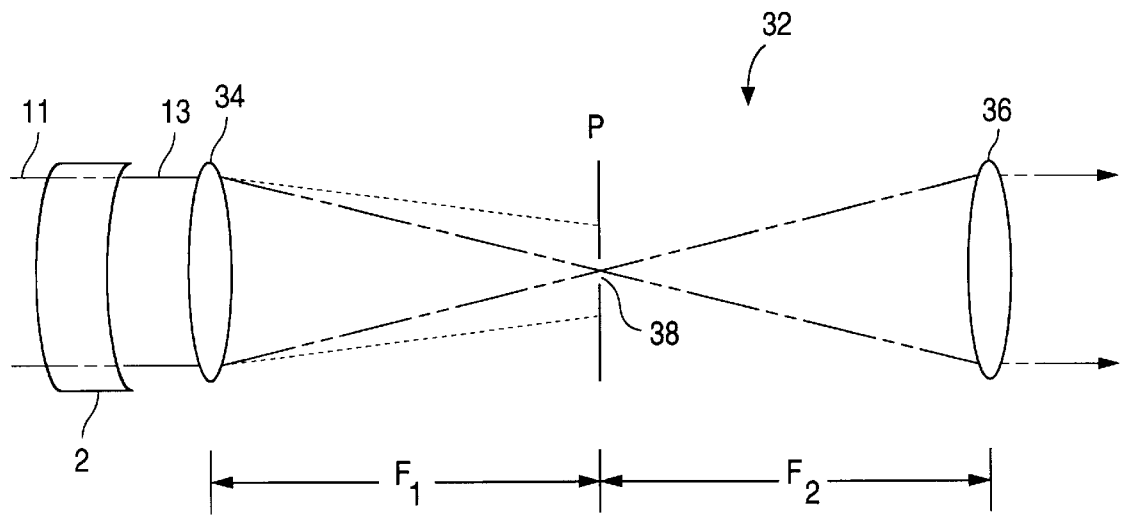
FIG. 4 is a side view of the one-dimensional spatial filter for the output beam of the unstable resonator of the present invention.

In order to minimize low coherence light in the output beam 13, which results from Amplified Spontaneous Emission (ASE), a one dimensional external spatial filter 32 is placed on the output beam 13 as illustrated in FIG. 4. Spatial filter 32 includes a first cylindrical lens 34 having a focal length $F_1$ in the vertical (Y) axis, and a second cylindrical lens 36 with a focal length $F_2$ in the vertical (Y) axis. The lenses 34/36 are flat in the horizontal (X) axis, and are preferably separated by a distance approximately equal to $F_1+F_2$ so that there is a common vertical axis focal point P for both lenses. The curvatures of lenses 34/36 are both in the same plane as the unstable resonator (vertical Y plane). A horizontally extending slit aperture 38 is placed near the common focal point P of the two lenses 34/36, which is the plane of sharpest focus for the low divergence portion of beam 13 (corresponding to the unstable axis of resonator 1). The length of the slit is aligned to extend in the high divergence direction of beam 13 (corresponding to the stable axis of resonator 1). The dotted lines in FIG. 4 represent the more divergent low coherence light portion of beam 13 resulting from ASE. A higher output power beam can be used without damaging the aperture by using cylindrical lenses to focus the Y component of the beam down to a line, rather than using spherical lenses to focus both the X and Y components down to a small spot, because the power density is spread out along a line at P. Thus, high power densities that would destroy a pin-hole aperture are avoided. In addition to filtering out low coherence light resulting from the ASE, the selection of lenses 34/36 of spatial filter 32 also can be used to increase or decrease the size of the output beam 13 in the Y direction as needed because the output beam size is changed by a factor $F_2/F_1$.

A spatial filter 32 has been developed for a hybrid resonator where mirror 2 has a 300 mm radius of curvature for both surfaces 12/14, lens 6 has a focal length of 3400 mm, and distance $L_1$ is 1550 mm. The two cylindrical lenses 34/36 both have a focal length equal to 1 meter, and the slit aperture 38 is 0.5 mm wide. The total throughput was measured at 58%, with a markedly improved spatial coherence of beam 13 exiting the spatial filter 32.

It is to be understood that the present invention is not limited to the embodiments described above and illustrated herein, but encompasses any and all variations falling within the scope of the appended claims. For example, while the preferred embodiment of the resonator 1 is illustrated in a pulsed excimer laser system using a gain cavity with a gas mixture of a halogen gas and a rare gas, the laser resonator 1 of the present invention can be used in any appropriate laser system with any appropriate gain medium, CW or pulsed. Further, the resonator configurations above were described in terms of the horizontal or vertical axes (X/Y), but the X and Y axes correspond to any azimuthal angles, relative to the optical axis of the resonator 1, that are orthogonal to each other. Lastly, while two optics (lens 6 and mirror 2) are shown to create a hybrid resonator above, it should be noted that many different combinations of optical elements (mirrors and lenses) can be used to create a stable resonator in one axis, and an unstable resonator in an orthogonal axis, because resonator stability is a function of the combination of the focusing powers of all intracavity elements.

What is claimed is:

1. A hybrid resonator for a laser, comprising:
   a resonant cavity having an optical axis; and
   a gain medium disposed in the resonant cavity for generating a laser beam that oscillates in the resonant cavity along the optical axis, wherein a portion of the laser beam is coupled out of the resonant cavity as an output laser beam;
   the resonant cavity including:
      at least one optical element having a cylindrical surface oriented to diverge the laser beam at a first azimuthal angle relative to the resonant cavity axis, and
      a dispersive wavelength selector that disperses the laser beam as a function of wavelength at a second azimuthal angle relative to the resonant cavity axis, the second azimuthal angle is orthogonal to the first azimuthal angle.

2. The resonator as recited in claim 1, wherein the resonant cavity is a stable optical resonator in the second azimuthal angle, and is an unstable optical resonator in the first azimuthal angle.

3. The resonator as recited in claim 1, wherein:
   the optical element is a cylindrical mirror having a cylindrical reflecting surface oriented at the first azimuthal angle.

4. The resonator as recited in claim 3, further comprising:
   a cylindrical lens having a cylindrical surface oriented at the first azimuthal angle.

5. The resonator as recited in claim 4, wherein:
   the cylindrical reflecting surface of the mirror is convex in the first azimuthal angle and straight in the second azimuthal angle; and
   the cylindrical surface of the lens is convex in the first azimuthal angle and straight in the second azimuthal angle.

6. The resonator as recited in claim 5, wherein:
   the cylindrical lens has a focal length of F in the first azimuthal angle,
   the cylindrical reflecting surface of the mirror has a radius of curvature R in the first azimuthal angle,
   the cylindrical lens and the mirror are separated from each other by a distance L, where L substantially equals $(F-R)/2$.

7. The resonator as recited in claim 5, wherein the resonant cavity further comprises:
   a beam expander disposed adjacent the dispersive wavelength selector that expands the laser beam before the laser beam reaches the dispersive wavelength selector.

8. The resonator as recited in claim 4, wherein the resonant cavity further includes:
   a thin film polarizer disposed along the optical axis to fold the optical axis by reflecting the laser beam,
   a quarter wave plate disposed along the optical axis, wherein the thin film polarizer transmits a portion of the laser beam to form the output laser beam.

9. The resonator as recited in claim 8, wherein:
   the cylindrical lens is disposed between the polarizer and the wavelength selector,
   the cylindrical surface of the lens is concave in the first azimuthal angle, and
   the waveplate is disposed between the polarizer and the cylindrical mirror.

10. The resonator as recited in claim 9, wherein:
    the cylindrical lens has a focal length of F in the first azimuthal angle,
    the cylindrical reflecting surface of the cylindrical mirror has a radius of curvature R in the first azimuthal angle, and
    the cylindrical lens and the cylindrical mirror are separated from each other along the folded axis of the resonant cavity by a distance L, where L substantially equals $(R-F)/2$.

11. The resonator as recited in claim 3, wherein the dispersive wavelength selector is a planar dispersive grating having diffraction grooves that extend parallel to the first azimuthal angle.

12. The resonator as recited in claim 3, wherein the dispersive wavelength selector comprises a prism and a reflective mirror.

13. The resonator as recited in claim 1, further comprising a spatial filter disposed along the output laser beam, the spatial filter includes:
    a second cylindrical lens disposed along the output laser beam and oriented to focus the output laser beam in the first azimuthal angle;
    a slit aperture disposed in the focused output laser beam and oriented so that a length of the slit aperture extends in the second azimuthal angle;
    a third cylindrical lens disposed along the output laser beam and oriented to collimate the output laser beam in the first azimuthal angle after the output laser beam has passed through the slit aperture.

14. The resonator as recited in claim 13, wherein:
    the second cylindrical lens has a focal length of $F_1$ in the first azimuthal angle,
    the third cylindrical lens has a focal length of $F_2$ in the first azimuthal angle,
    the second and third cylindrical lenses are spaced apart from each other along the output laser beam by a distance of substantially $F_1+F_2$, and
    the slit aperture is disposed between the second and third cylindrical lenses at a distance of substantially $F_1$ away from the second cylindrical lens, and substantially $F_2$ away from the third cylindrical lens.

15. A laser system, comprising:

a hybrid resonant cavity terminating at one end with a cylindrical mirror and at the other end with a dispersive wavelength selector;

a gain medium disposed in the resonant cavity;

a power supply that excites the gain medium to generate a laser beam that oscillates in the resonant cavity, wherein a portion of the laser beam is coupled out of the resonant cavity as an output laser beam;

the cylindrical mirror having a cylindrical reflecting surface oriented to diverge the laser beam at a first azimuthal angle relative to an axis of the resonant cavity; and the dispersive wavelength selector disperses the laser beam as a function of wavelength at a second azimuthal angle relative to the resonant cavity axis, the second azimuthal angle is orthogonal to the first azimuthal angle.

16. The laser system as recited in claim 15, wherein the resonant cavity is a stable optical resonator in the second azimuthal angle, and is an unstable optical resonator in the first azimuthal angle.

17. The laser system as recited in claim 16, wherein the resonant cavity further includes:

a thin film polarizer disposed along the optical axis to fold the optical axis by reflecting the laser beam, a quarter wave plate disposed along the optical axis, wherein the thin film polarizer transmits a portion of the laser beam to form the output laser beam.

18. The laser system as recited in claim 17, wherein:

the cylindrical lens is disposed between the polarizer and the wavelength selector, the cylindrical surface of the lens is concave in the first azimuthal angle, and the waveplate is disposed between the polarizer and the cylindrical mirror.

19. The laser system as recited in claim 18, wherein:

the cylindrical lens has a focal length of F in the first azimuthal angle, the cylindrical reflecting surface of the cylindrical mirror has a radius of curvature R in the first azimuthal angle, and the cylindrical lens and the cylindrical mirror are separated from each other along the folded axis of the resonant cavity by a distance L, where L substantially equals $(R-|F|)/2$.

20. The laser system as recited in claim 15, wherein the resonant cavity further comprises a cylindrical lens having a cylindrical surface oriented at the first azimuthal angle.

21. The laser system as recited in claim 20, wherein:

the cylindrical reflecting surface of the mirror is convex in the first azimuthal angle and straight in the second azimuthal angle; and the cylindrical surface of the lens is convex in the first azimuthal angle and straight in the second azimuthal angle.

22. The laser system as recited in claim 21, wherein:

the cylindrical lens has a focal length of F in the first azimuthal angle, the cylindrical reflecting surface of the mirror has a radius of curvature R in the first azimuthal angle, the cylindrical lens and the mirror are separated from each other by a distance L, where L substantially equals $(F-R)/2$.

23. The laser system as recited in claim 20, wherein the resonant cavity further comprises:

a beam expander disposed adjacent the dispersive wavelength selector that expands the laser beam before the laser beam reaches the dispersive wavelength selector.

24. The laser system as recited in claim 20, wherein the dispersive wavelength selector is a planar dispersive grating having diffraction grooves that extend parallel to the first azimuthal angle.

25. The laser system as recited in claim 20, wherein the dispersive wavelength selector comprises a prism and a reflective mirror.

26. The laser system as recited in claim 15, further comprising a spatial filter disposed along the output laser beam, the spatial filter includes:

a second cylindrical lens disposed along the output laser beam and oriented to focus the output laser beam in the first azimuthal angle;

a slit aperture disposed in the focused output laser beam and oriented so that a length of the slit aperture extends in the second azimuthal angle;

a third cylindrical lens disposed along the output laser beam and oriented to collimate the output laser beam in the first azimuthal angle after the output laser beam has passed through the slit aperture.

27. The laser system as recited in claim 26, wherein:

the second cylindrical lens has a focal length of $F_1$ in the first azimuthal angle, the third cylindrical lens has a focal length of $F_2$ in the first azimuthal angle, the second and third cylindrical lenses are spaced apart from each other along the output laser beam by a distance of substantially $F_1+F_2$, and the slit aperture is disposed between the second and third cylindrical lenses at a distance of substantially $F_1$ away from the second cylindrical lens, and substantially $F_2$ away from the third cylindrical lens.

28. An excimer laser, comprising:

a hybrid resonant cavity that is stable in a first axis and unstable in a second axis orthogonal to the first axis;

a gain medium disposed in the resonant cavity to generate a laser beam in the resonant cavity, wherein a portion of the laser beam is coupled out of the resonant cavity as an output laser beam; and a dispersive wavelength selector oriented to disperse the laser beam as a function of wavelength in the first axis.

29. The excimer laser as recited in claim 28, wherein the resonant cavity includes at least one optical element having a cylindrical surface oriented to diverge the laser beam in the second axis.

30. The excimer laser as recited in claim 29, wherein the optical element is a cylindrical mirror having a cylindrical reflecting surface oriented in the second axis.

31. The excimer laser as recited in claim 30, further comprising:

a cylindrical lens having a cylindrical surface oriented in the second axis.

32. The excimer laser as recited in claim 31, wherein:

the cylindrical reflecting surface of the mirror is convex in the second axis and straight in the first axis; and the cylindrical surface of the lens is convex in the second axis and straight in the first axis.

33. The excimer laser as recited in claim 32, wherein:

the cylindrical lens has a focal length of F in the second axis, the cylindrical reflecting surface of the mirror has a radius of curvature R in the second axis, and the cylindrical lens and the mirror are separated from each other by a distance L, where L substantially equals (F−R)/2.

34. The excimer laser as recited in claim 32, wherein the resonant cavity further comprises:

a beam expander disposed adjacent the dispersive wavelength selector that expands the laser beam before the laser beam reaches the dispersive wavelength selector.

35. The excimer laser as recited in claim 31, wherein the resonant cavity further includes:

a thin film polarizer disposed in the resonant cavity to fold the laser beam by reflection, a quarter wave plate disposed in the resonant cavity, wherein the thin film polarizer transmits a portion of the laser beam to form the output laser beam.

36. The excimer laser as recited in claim 35, wherein:

the cylindrical lens is disposed between the polarizer and the wavelength selector, the cylindrical surface of the lens is concave in the second axis, and the waveplate is disposed between the polarizer and the cylindrical mirror.

37. The excimer laser as recited in claim 31, wherein:

the cylindrical lens has a focal length of F in the second axis, the cylindrical reflecting surface of the cylindrical mirror has a radius of curvature R in the second axis, and the cylindrical lens and the cylindrical mirror are separated from each other along the folded laser beam by a distance L, where L substantially equals (R−|F|)/2.

38. The excimer laser as recited in claim 30, wherein the dispersive wavelength selector is a planar dispersive grating having diffraction grooves that extend parallel to the second axis.

39. The excimer laser as recited in claim 30, wherein the dispersive wavelength selector comprises a prism and a reflective mirror.

40. The excimer laser as recited in claim 28, further comprising a spatial filter disposed along the output laser beam, the spatial filter includes:

a second cylindrical lens disposed along the output laser beam and oriented to focus the output laser beam in the second axis;

a slit aperture disposed in the focused output laser beam and oriented so that a length of the slit aperture extends in the first axis;

a third cylindrical lens disposed along the output laser beam and oriented to collimate the output laser beam in the second axis after the output laser beam has passed through the slit aperture.

41. The excimer laser as recited in claim 40, wherein:

the second cylindrical lens has a focal length of $F_1$ in the second axis, the third cylindrical lens has a focal length of $F_2$ in the second axis, the second and third cylindrical lenses are spaced apart from each other along the output laser beam by a distance of substantially $F_1+F_2$, and the slit aperture is disposed between the second and third cylindrical lenses at a distance of substantially $F_1$ away from the second cylindrical lens, and substantially $F_2$ away from the third cylindrical lens.

* * * * *

UNITED STATES PATENT AND TRADEMARK OFFICE
CERTIFICATE OF CORRECTION

PATENT NO. : 5,946,337
DATED : August 31, 1999
INVENTOR(S) : Sergei V. Govorkov et al.

It is certified that error appears in the above-identified patent and that said Letters Patent is hereby corrected as shown below:

On the Title page, item [54] Title change "SPECIAL" to --SPECTRAL--.

Signed and Sealed this

Eighteenth Day of April, 2000

Attest:

Q. TODD DICKINSON

Attesting Officer

Director of Patents and Trademarks